US011802995B2

United States Patent
Chang et al.

(10) Patent No.: US 11,802,995 B2
(45) Date of Patent: Oct. 31, 2023

(54) MEMBRANE STRUCTURE AND TRANSPARENT SUBSTRATE HAVING SPECIFIED NANOMETER-SCALE THICKNESS FILMS

(71) Applicant: TPK Advanced Solutions Inc., Fujian (CN)

(72) Inventors: Yenhsiang Chang, Taichung (TW); Weibin Wu, Zhangzhou (CN); Yungfeng Yeh, Tainan (TW); Xiangkang Wei, Shaowu (CN)

(73) Assignee: TPK ADVANCED SOLUTIONS INC., Fujian (CN)

(*) Notice: Subject to any disclaimer, the term of this patent is extended or adjusted under 35 U.S.C. 154(b) by 341 days.

(21) Appl. No.: 16/992,015

(22) Filed: Aug. 12, 2020

(65) Prior Publication Data
US 2021/0405263 A1   Dec. 30, 2021

(30) Foreign Application Priority Data
Jun. 30, 2020   (CN) .......................... 202010620727.5

(51) Int. Cl.
| G02B 1/115 | (2015.01) |
| G02B 1/14 | (2015.01) |
| G02B 5/28 | (2006.01) |
| G02F 1/1335 | (2006.01) |
| G02B 5/30 | (2006.01) |

(52) U.S. Cl.
CPC ............... *G02B 1/115* (2013.01); *G02B 1/14* (2015.01); *G02B 5/28* (2013.01); *G02B 5/3083* (2013.01); *G02F 1/133502* (2013.01); *G02F 2201/38* (2013.01)

(58) Field of Classification Search
CPC .............. G02B 1/11–118; G02B 5/285; G02F 1/133502; G02F 2201/38
See application file for complete search history.

(56) References Cited

U.S. PATENT DOCUMENTS

| 9,760,193 | B2* | 9/2017 | Hsu | ......................... G06F 3/041 |
| 9,823,388 | B2* | 11/2017 | Hsu | ....................... G02B 5/0278 |
| 10,152,149 | B2* | 12/2018 | Hsu | ......................... C03C 17/22 |
| 2004/0150883 | A1* | 8/2004 | Shimoda | ............... G02B 5/0278 |
| | | | | 359/443 |
| 2011/0033681 | A1* | 2/2011 | Adachi | .................. G02B 1/115 |
| | | | | 428/212 |
| 2015/0009570 | A1* | 1/2015 | Amano | .................. G02B 1/115 |
| | | | | 359/601 |
| 2017/0192255 | A1* | 7/2017 | Santan | ...................... G02C 7/10 |
| 2018/0188533 | A1* | 7/2018 | Ogiwara | ................ G02B 27/01 |
| 2022/0411665 | A1* | 12/2022 | Beyler | ...................... B32B 1/00 |

FOREIGN PATENT DOCUMENTS

| TW | M526121 U | 7/2016 |
| TW | 201833596 A | 9/2018 |
| TW | 201833629 A | 9/2018 |

* cited by examiner

*Primary Examiner* — Ryan S Dunning
(74) *Attorney, Agent, or Firm* — Cooper Legal Group, LLC (57) ABSTRACT

A membrane structure includes a plurality of first refraction films and a plurality of second refraction films. The second refraction films and the first refraction films are alternately stacked. A transparent substrate including the membrane structure is disclosed. The membrane structure can effectively reduce the reflectance of light.

15 Claims, 7 Drawing Sheets

MEMBRANE STRUCTURE AND TRANSPARENT SUBSTRATE HAVING SPECIFIED NANOMETER-SCALE THICKNESS FILMS

CROSS-REFERENCE TO RELATED APPLICATIONS

This Non-provisional application claims priority under 35 U.S.C. § 119(a) to Patent Application No. CN202010620727.5, filed in People's Republic of China on Jun. 30, 2020, the entire contents of which are hereby incorporated by reference.

BACKGROUND

Technology Field

The present disclosure relates to a membrane structure and, in particular, to an anti-reflection (AR) membrane structure and a transparent substrate.

Description of Related Art

With the rapid development and popularization of flat display products, anti-reflection films have become an essential component in pursuit of higher visual effects. Because reducing reflected light can improve the contrast and color vividness of display products, various information products, communication products, and televisions all utilize the anti-reflection films for reducing the reflected light, thereby improving the image quality.

For example, a protective cover or a touch panel of a flat display device is susceptible to reflected light generated by an external light source projected on the product surface when the external light is strong or when the flat display device is in a car environment, which affects the comfort or safety of the viewer. Therefore, it is necessary to provide an anti-reflection film for reducing the surface reflection of light.

On a curved side of conventional two-and-a-half-dimensional (2.5D) or three-dimensional (3D) transparent glass (e.g. the cover glass or touch glass), the anti-reflection film may cause poor touch smoothness and have a chromatic aberration problem (e.g. gold or red border).

SUMMARY

An objective of this disclosure is to provide a membrane structure with AR function and a transparent substrate comprising the membrane structure, which can effectively reduce the reflectance of light.

Another objective of this disclosure is to provide a transparent substrate that can carry out the smooth touch and improve the border chromatic aberration phenomenon.

To achieve the above, the present disclosure provides a membrane structure, which comprises a plurality of first refraction films and a plurality of second refraction films. The second refraction films and the first refraction films are alternately stacked.

In one embodiment, the first refraction films are made of $SiO_2$, $Al_2O_3$, or ZnO, and the second refraction films are made of $Nb_2O_5$, $Ti_3O_5$, or $Ta_2O_5$.

In one embodiment, a thickness of each of the first refraction films is between 10 nm and 110 nm, and a thickness of each of the second refraction films is between 4 nm and 90 nm.

In one embodiment, the first refraction films and the second refraction films total at least ten films stacked on a transparent base in order. The second refraction films comprise a first film, a third film, a fifth film, a seventh film, and a ninth film, and the first refraction films comprise a second film, a fourth film, a sixth film, an eighth film, and a tenth film. The first film is located at a position closest to the transparent base.

In one embodiment, a thickness of the first film is between 3.92 nm and 7.28 nm, a thickness of the second film is between 57.81 nm and 107.37 nm, a thickness of the third film is between 9.59 nm and 17.81 nm, a thickness of the fourth film is between 38.68 nm and 71.83 nm, a thickness of the fifth film is between 21.89 nm and 40.65 nm, a thickness of the sixth film is between 14.64 nm and 27.18 nm, a thickness of the seventh film is between 59.07 nm and 109.71 nm, a thickness of the eighth film is between 9.35 nm and 17.37 nm, a thickness of the ninth film is between 22.06 nm and 40.96 nm, and a thickness of the tenth film is between 71.49 nm and 132.77 nm.

In one embodiment, the first refraction films further comprise a zero film disposed between the first film and the transparent base, and a thickness of the zero film is between 27.45 nm and 50.99 nm.

In one embodiment, the membrane structure further comprises a protection film disposed at a side of the tenth film away from the transparent base.

In one embodiment, a refraction index of the first refraction films is less than a refraction index of the second refraction films.

In one embodiment, when a wavelength of an incident light is between 400 nm and 900 nm, an average refraction index of the membrane structure is less than 5.5%.

To achieve the above, the present disclosure also provides a transparent substrate, which comprises a transparent base and a membrane structure as mentioned above. The transparent base has a first surface and a second surface opposite to the first surface. The membrane structure is disposed on at least one of the first surface or the second surface of the transparent base.

In one embodiment, the transparent substrate is a 2D, 2.5D, or 3D rigid substrate, or a 2D, 2.5D, or 3D flexible substrate.

To achieve the above, the present disclosure further provides a transparent substrate having a planar surface and at least a curved side. The curved side is connected to the planar surface. The curved side comprises a radius corner, a side, and a chamfer corner, and the planar surface is connected to the radius corner.

In one embodiment, the transparent base is a 2D, 2.5D, or 3D transparent glass.

In one embodiment, a length of the side is equal to a thickness of the transparent base minus a length of the radius corner in a thickness direction of the transparent base and minus a length of the chamfer corner in the thickness direction of the transparent base.

In one embodiment, a curvature radius of the radius corner is between 1 mm and 10 mm, and a length of the chamfer corner is 0.15 mm.

In one embodiment, the transparent substrate further comprises a membrane structure as mentioned above. The membrane structure is disposed on the planar surface of the transparent base and extends to cover the radius corner of the curved side.

As mentioned above, in the membrane structure and the transparent substrate of this disclosure, a plurality of second refraction films and a plurality of first refraction films are alternately stacked. The structural design and the configurations of the refraction indexes of the first refraction films and the second refraction films can effectively reduce the reflectance of light.

In addition, in the transparent substrate of this disclosure, the curved side of the transparent base comprises a radius corner, a side, and a chamfer corner in order, and the planar surface of the transparent base is connected to the radius corner. This structural design can carry out the smooth touch around the side edges and further improve the border chromatic aberration phenomenon. Moreover, in one embodiment of this disclosure, the transparent substrate can achieve wider optical thickness and wider physical thickness according to the structural design of the membrane structure and the matching of the refraction indexes of the coating materials. Accordingly, the planar surface of the transparent substrate can have a lower light reflectance, thereby avoiding the chromatic aberration problem (e.g. gold or red border) at the curved side.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

The present disclosure will be apparent from the following detailed description, which proceeds with reference to the accompanying drawings, wherein the same references relate to the same elements.

Figure 1:
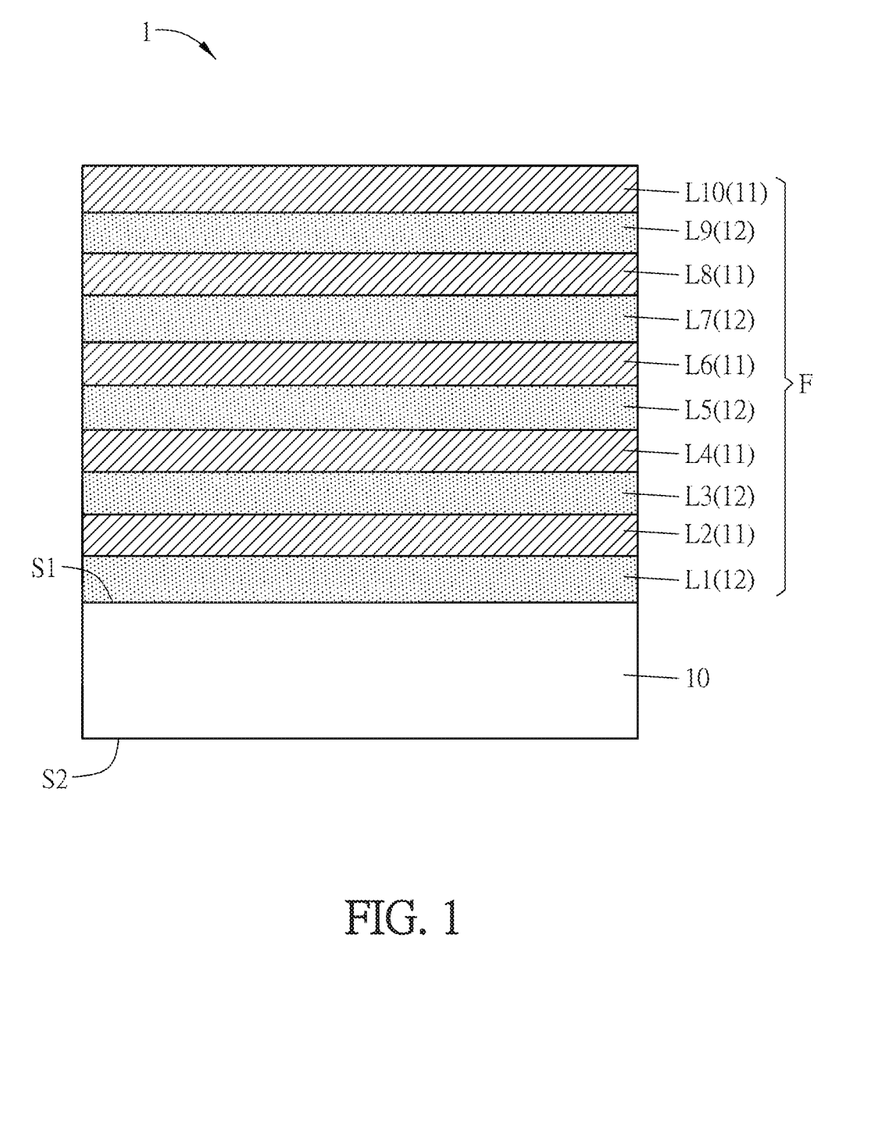
FIG. 1 is a schematic diagram of a transparent substrate according to an embodiment of this disclosure.

FIG. 1 is a schematic diagram of a transparent substrate according to an embodiment of this disclosure. Referring to FIG. 1, the transparent substrate 1 can be a two-dimensional (2D), 2.5D, or 3D rigid substrate, or a 2D, 2.5D, or 3D flexible substrate. The rigid substrate can be, for example but not limitation, a transparent glass, and the flexible substrate can be, for example but not limitation, a polyimide (PI) flexible substrate. In this embodiment, the transparent substrate 1 is a 2.5D rigid substrate such as, for example but not limitation, a transparent glass.

The transparent substrate 1 comprises a transparent base 10 and a membrane structure F.

The transparent base 10 has a first surface S1 (the upper surface) and a second surface S2 (the lower surface) opposite to the first surface S1. The membrane structure F is an anti-reflection film, which is disposed on the first surface S1 and/or the second surface S2 of the transparent base 10. In this embodiment, the membrane structure F is, for example, disposed on the first surface S1 (the upper surface) of the transparent base 10.

The membrane structure F comprises a plurality of first refraction films 11 (all made from a same material) and a plurality of second refraction films 12 (all made from a same material), and the second refraction films 12 and the first refraction films 11 are alternately stacked. The first refraction films 11 and the second refraction films 12 are, in total, at least ten stacked films. To be noted, the total number of the first refraction films 11 and the second refraction films 12 can be less than ten, and this disclosure is not limited to a certain number. In more detailed, a first refraction film 11, a second refraction film 12, a first refraction film 11, a second refraction film 12, etc. are stacked on the transparent base 10 in order. Alternatively, a second refraction film 12, a first refraction film 11, a second refraction film 12, a first refraction film 11, etc. are stacked on the transparent base 10 in order. In addition, the number of the first refraction films 11 can be the same as or different from the number of the second refraction films 12. In this embodiment, the number of the first refraction films 11 is the same as the number of the second refraction films 12, and there are five first refraction films 11 and five second refraction films 12 for example. Thus, the total number of the first refraction films 11 and the second refraction films 12 is ten.

In this embodiment, the membrane structure F comprises ten films stacked on the transparent base 10 in order. In the ten films, the second refraction films 12 comprise a first film L1, a third film L3, a fifth film L5, a seventh film L7, and a ninth film L9 (totally five films), and the first refraction films 11 comprise a second film L2, a fourth film L4, a sixth film L6, an eighth film L8, and a tenth film L10 (totally five films). The first film L1 is located at a position closest to the transparent base 10. In order to clearly indicate the property and position of each of the ten films in the membrane structure F, the films are labeled L1-L10 and 11/12 (first refraction film 11 or second refraction film 12). For example, L4(11) indicates that the film is the fourth film and is a first refraction film 11, and L7(12) indicates that the film is the seventh film and is a second refraction film 12.

The refraction index of the first refraction film 11 is less than the refraction index of the second refraction film 12. For example, the first refraction film 11 is made of a material with a smaller refraction index, such as $SiO_2$ (1.46/500 nm), $Al_2O_3$ (1.63/550 nm), or ZnO (2.0/550 nm), and the second refraction film 12 is made of a material with larger refraction index, such as $Nb_2O_5$ (2.3/550 nm), $Ti_3O_5$ (2.35/550 nm), or $Ta_2O_5$ (2.1/550 nm). In this embodiment, the first refraction film 11 is made of $SiO_2$, and the second refraction film 12 is made of $Ti_3O_5$.

The thickness of each first refraction film 11 can be between 10 nm and 110 nm, and the thickness of each second refraction film 12 can be between 4 nm and 90 nm. In this embodiment, the thickness of the film is defined along the direction perpendicular to the first surface S1 or the second surface S2 of the transparent base 10. In some embodiments, the thickness of the first film L1 is between 3.92 nm and 7.28 nm (e.g. 4.05, 5.59, 6.33, or 7.18 nm), the thickness of the second film L2 is between 57.81 nm and 107.37 nm (e.g. 62.50, 77.36, 82.69, or 103.58 nm), the thickness of the third film L3 is between 9.59 nm and 17.81 nm (e.g. 10.25, 13.25, 15.84, or 17.12 nm), the thickness of the fourth film L4 is between 38.68 nm and 71.83 nm (e.g. 39.69, 45.36, 55.95, or 70.51 nm), the thickness of the fifth film L5 is between 21.89 nm and 40.65 nm (e.g. 23.52, 31.58, 36.51, or 39.21 nm), the thickness of the sixth film L6 is between 14.64 nm and 27.18 nm (e.g. 14.88, 16.57, 20.19, or 26.22 nm), the thickness of the seventh film L7 is between 59.07 nm and 109.71 nm (e.g. 63.25, 84.54, 96.53, or 103.98 nm), the thickness of the eighth film L8 is between 9.35 nm and 17.37 nm (e.g. 10.36, 13.06, 15.82, or 17.20 nm), the thickness of the ninth film L9 is between 22.06 nm and 40.96 nm (e.g. 25.32, 31.15, 36.69, or 39.21 nm), and the thickness of the tenth film L10 is between 71.49 nm and 132.77 nm (e.g. 78.64, 95.21, 102.96, or 126.96 nm). To be noted, the above-mentioned ranges of the thicknesses are only examples, and this disclosure is not limited thereto.

Figure 2A:
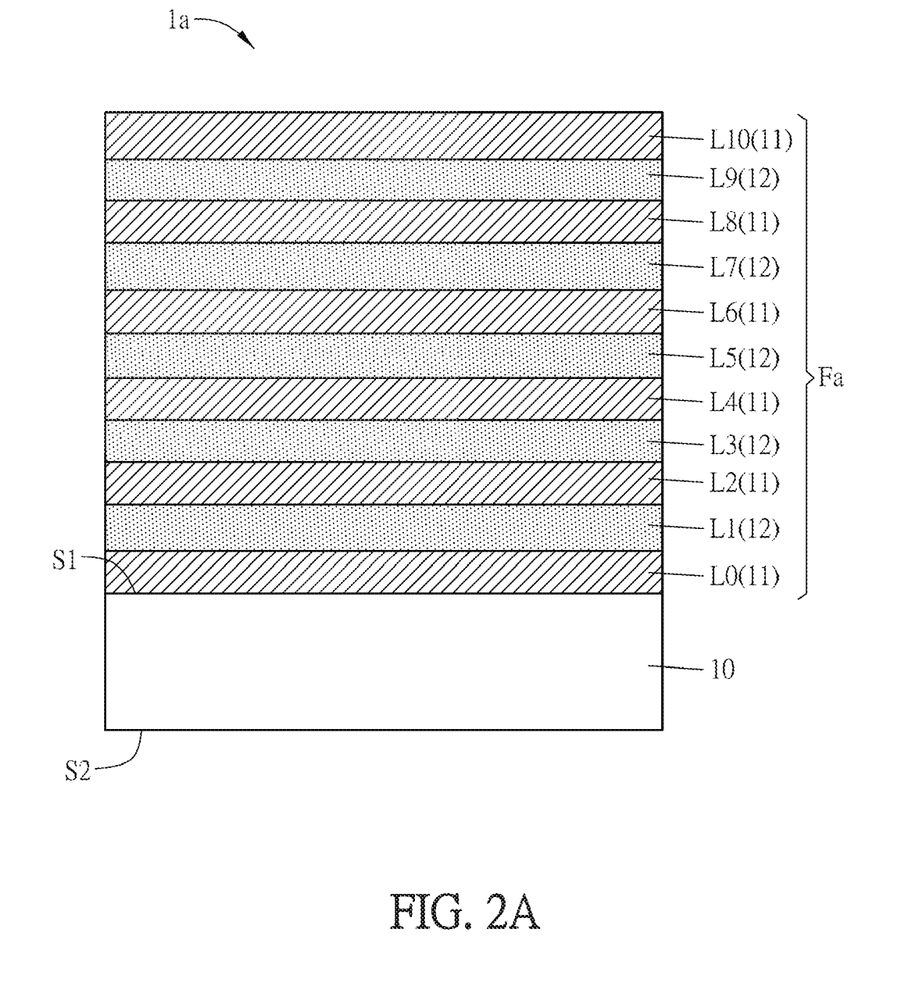
FIGS. 2A to 2C are schematic diagrams showing the transparent substrates according to different embodiments of this disclosure.

In some embodiments, a magnetron sputtering process utilizing an inductively coupled plasma can be performed to make the first refraction films 11 and the second refraction films 12, which are of different refraction indexes, by ways of oxidation. The first refraction films 11 and the second refraction films 12 are used for obtaining wider optical thickness and wider physical thickness by matching different refraction indexes. Since the light passing through different media can generate different phenomena, when the reflected lights of different refraction films generate destructive interferences with each other, the reflected lights will be offset, which can effectively reduce the reflectance of the incident light of the membrane structure F via the tenth film L10 (a first refraction film 11). Experiments have proven that the membrane structure F of this embodiment has a relatively low light reflectance at different incident light wavelengths, and color variation of the membrane structure F is not large at different light incident angles. It should be noted that the total number of the first refraction films 11 and the second refraction films 12 of the membrane structure F of the present disclosure is at least ten. When the total number of the first refraction films 11 and the second refraction films 12 of the membrane structure F increases, the light reflectance decreases. In addition, in the process of verifying the low reflectance of the membrane structure F, when the total number of the first refraction films 11 and the second refraction films 12 of the membrane structure F is less than ten (e.g. 9 films, 8 films, or 7 films), the performance of the light reflectance thereof is slightly worse than that of the membrane structure F comprising at least ten films FIGS. 2A to 2C are schematic diagrams showing the transparent substrates according to different embodiments of this disclosure. As shown in FIG. 2A, the configuration and connections of the transparent substrate 1a of this embodiment are mostly the same as those of the transparent substrate 1 of the above-mentioned embodiment. Different from the above-mentioned embodiment, in the transparent substrate 1a of this embodiment, the membrane structure Fa further comprises a zero film L0, which is disposed between the first film L1(12) and the transparent base 10. In this embodiment, the zero film L0 is a first refraction film 11. In other words, the zero film L0(11) is one of the first refraction films 11, and the thickness thereof is between 27.45 nm and 50.99 nm (e.g. 28.45, 32.14, 37.26, 39.75, or 46.35 nm). Specifically, in the membrane structure Fa of this embodiment, the total number of the first refraction films 11 (six films) is greater than the total number of the second refraction films 12 (five films). In addition, the zero film L0(11) contacts the transparent base 10, and the tenth film L10, which is the farthest film away from the transparent base 10, is also the first refraction film 11. Thus, the membrane structure Fa of this embodiment comprises a total of eleven films.

Figure 2B:
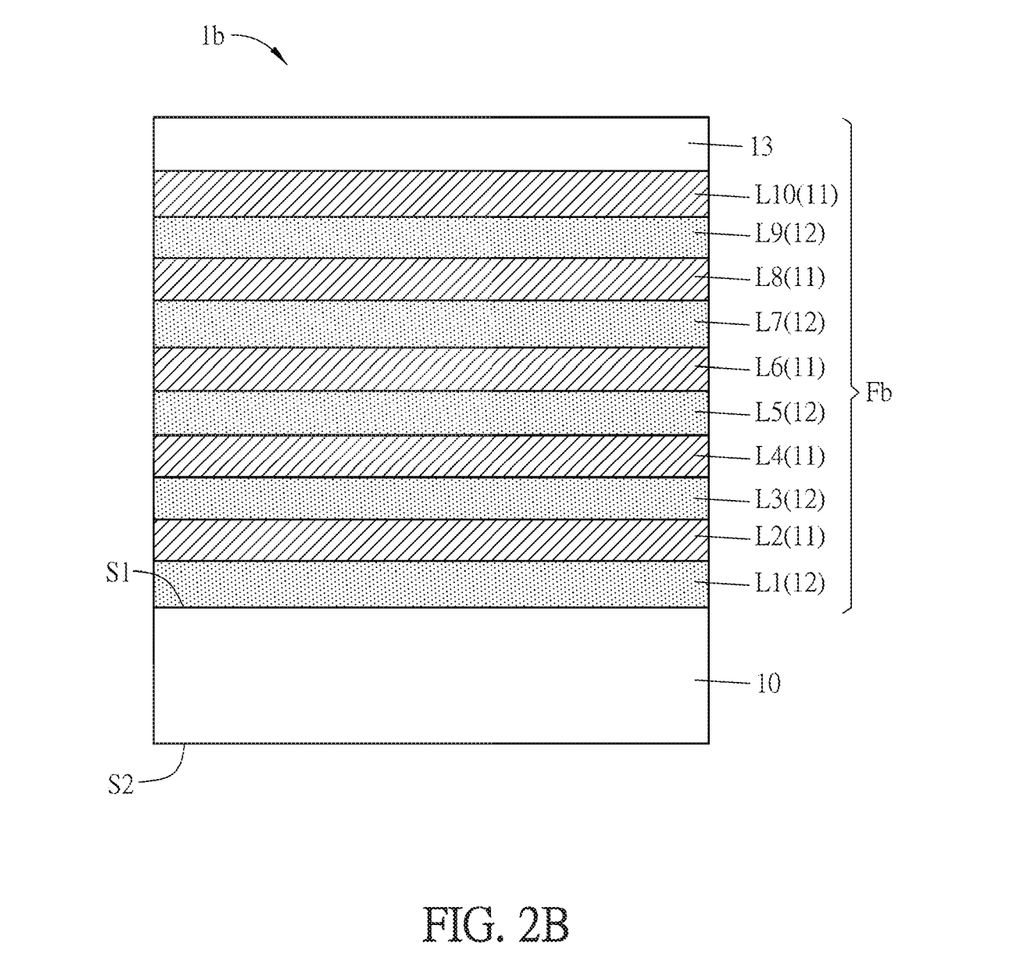

As shown in FIG. 2B, the configuration and connections of the transparent substrate 1b of this embodiment are mostly the same as those of the transparent substrate 1 of the above-mentioned embodiment. Different from the above-mentioned embodiment, in the transparent substrate 1b of this embodiment, the membrane structure Fb further comprises a protection film 13 disposed at one side of the tenth film L10(11) away from the transparent base 10. In this embodiment, the protection film 13 disposed on the tenth film L10(11) can be, for example but not limitation, a transparent anti-scratch film, an anti-finger printing film, a waterproof and anti-fouling film, an anti-spatter film, or other types of protection films, and this disclosure is not limited thereto.

Figure 2C:
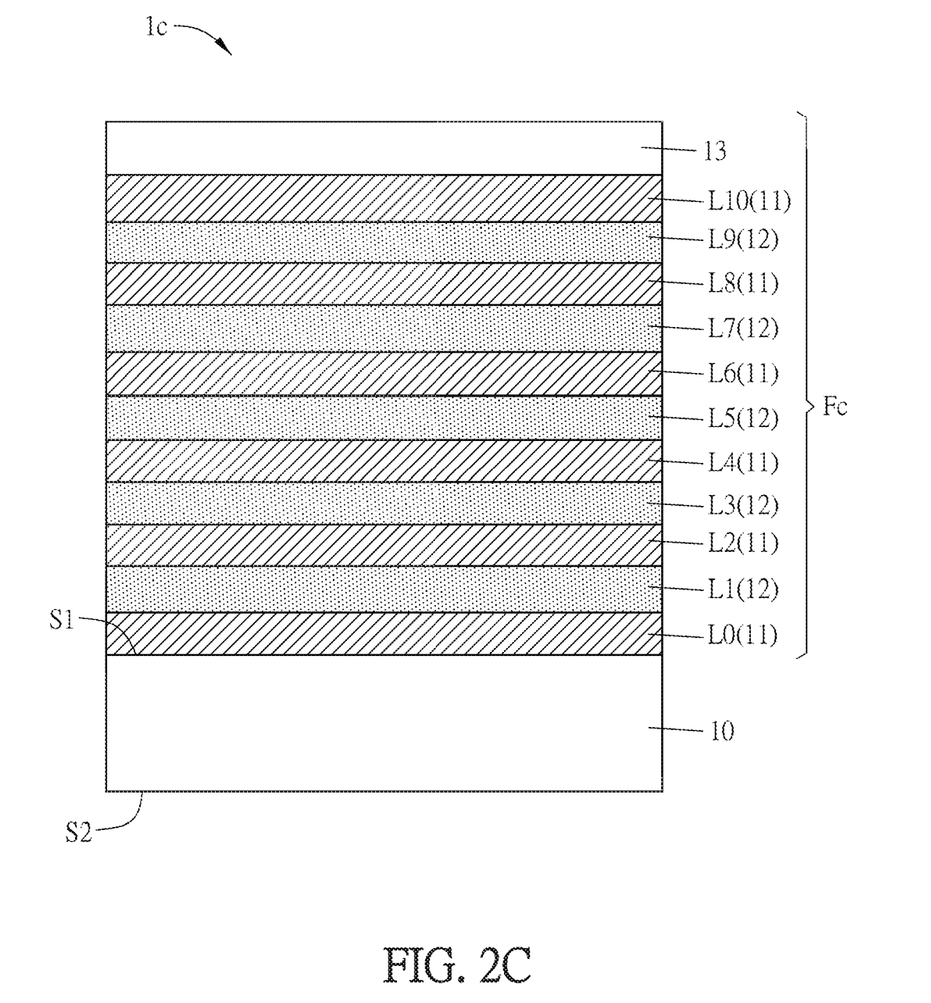

As shown in FIG. 2C, the configuration and connections of the transparent substrate 1c of this embodiment are mostly the same as those of the transparent substrate 1b of the above-mentioned embodiment. Different from the above-mentioned embodiment, in the transparent substrate 1c of this embodiment, the membrane structure Fc further comprises a protection film 13 disposed at one side of the tenth film L10 (a first refraction film 11) away from the transparent base 10. In this embodiment, the protection film 13 can be, for example but not limitation, a transparent anti-glare film, an anti-scratch film, an anti-finger printing film, a waterproof and anti-fouling film, an anti-spatter film, or other types of protection films, and this disclosure is not limited thereto.

Figure 3:
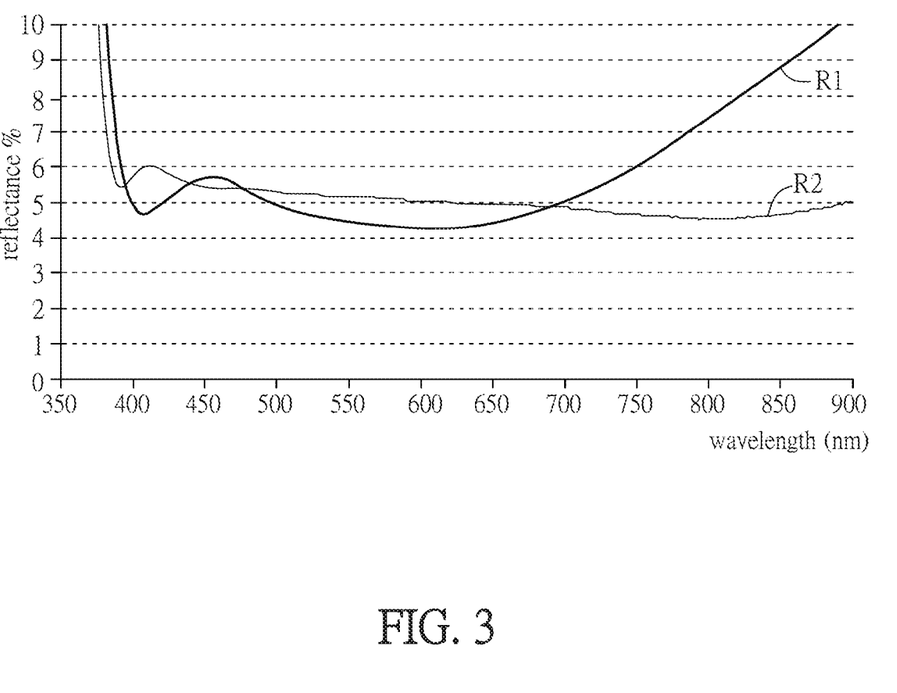
FIG. 3 is a schematic graph showing the reflectance vs. wavelengths of the membrane structures.

FIG. 3 is a schematic graph showing the reflectance vs. wavelengths of the membrane structures. As shown in FIG. 3, the curve R1 represents the reflectance spectrum curve of a conventional anti-reflection membrane structure, and the curve R2 represents the reflectance spectrum curve of an anti-reflection membrane structure according to an embodiment of this disclosure. Referring to FIG. 3, when the wavelength of the incident light is between 400 nm and 900 nm, the reflectance of the membrane structure of this disclosure is less than 6%. When the wavelength of the incident light is between 450 nm and 900 nm, the reflectance of the membrane structure of this disclosure is less than 5.5%, or even less than 5%. When the wavelength of the incident light is between 400 nm and 900 nm, the average reflectance of the membrane structure of this disclosure is less than 5.5%. Moreover, when the wavelength of the incident light is greater than 700 nm, the reflectance of the membrane structure of this disclosure is less than 5%. On the contrary, when the wavelength of the incident light is greater than 700 nm, the reflectance of the conventional membrane structure is dramatically increased. The comparison result of FIG. 3 indicates that the configuration of this disclosure, which alternately stacks the refraction films with different refraction indexes and performs the refraction matching, can achieve the goal of obtaining a lower reflectance than the conventional membrane structure.

In addition, the curved side of the conventional 2.5D and 3D transparent glass may have poor touch smoothness and have a chromatic aberration problem (e.g. gold or red border). Accordingly, this disclosure also provides a transparent substrate with a curved side, which has smooth touch and improves the chromatic aberration phenomenon of the curved side.

Figure 4:
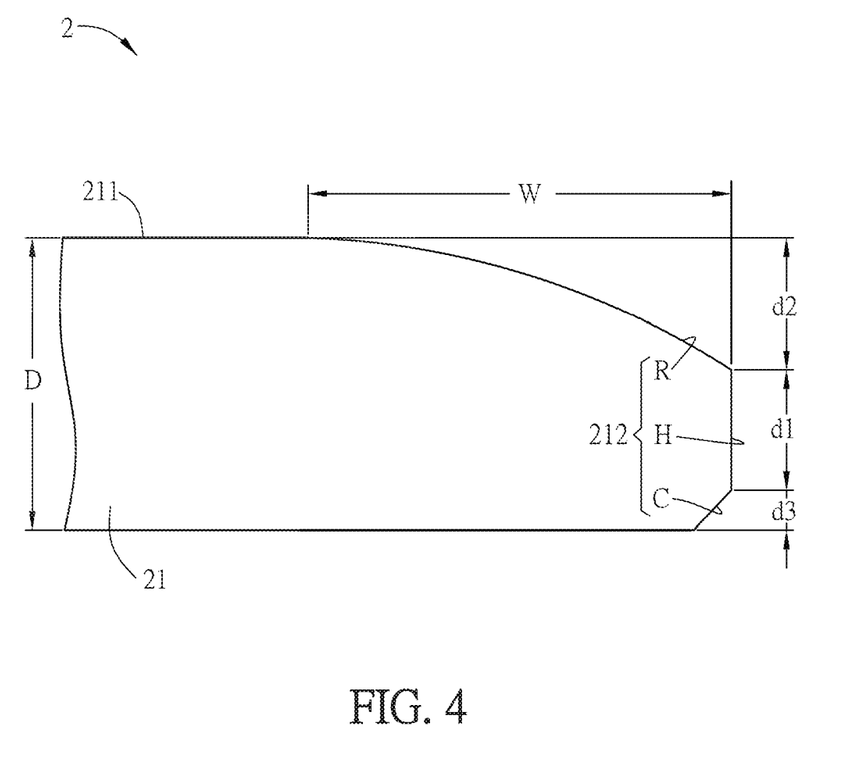
FIG. 4 is a schematic diagram of a transparent substrate according to another embodiment of this disclosure.

FIG. 4 is a schematic diagram of a transparent substrate according to another embodiment of this disclosure. As shown in FIG. 4, the transparent substrate 2 comprises a transparent base 21, which has a planar surface 211 and at least a curved side 212 connected to the planar surface 211. The transparent base 21 can be a 2D, 2.5D, or 3D transparent glass. Taking a quadrilateral transparent base 21 as an example, there can be at most four curved sides 212. Namely, the curved side 212 is located at the side of the transparent base 21 and is not a 90-degree right-angle side structure but rather a side containing a curved surface. The curved side 212 of the embodiment comprises a radius corner R, a side H, and a chamfer corner C in order. In this embodiment, the planar surface 211 is connected to the radius corner R, the side H is an uncut edge, the side H is connected to the radius corner R and the chamfer corner C, respectively, and the chamfer corner C is connected to the bottom surface of the transparent base 21.

In this embodiment, the length d1 of the side H is equal to the thickness D of the transparent base 21 minus the length d2 of the radius corner R in a thickness direction of the transparent base 21 and minus the length d3 of the chamfer corner C in the thickness direction of the transparent base 21 (d1=D−d2−d3). In this embodiment, the thickness D of the transparent base 21 or the length d1, d2, or d3 is defined by a thickness in the direction perpendicular to the planar surface 211 of the transparent base 21. In addition, the length W of the radius corner R along the direction parallel to the planar surface 211 is equal to (0.4467 ln(R)+1.1603). In some embodiments, the curvature radius of the radius corner R can be between 1 mm and 10 mm. In some embodiments, the curvature radius of the radius corner R can be, for example but not limitation, 1.15 mm, 1.59 mm, 3.5 mm, 4.96 mm, 6.75 mm, 8.25 mm, or 9.56 mm. In some embodiments, the radius corner R can be manufactured by, for example, a computer numerical control (CNC) machine, a grinding wheel, laser cutting, and/or polishing, so that the curvature radius of the radius corner R can be between 1 mm and 10 mm.

As mentioned above, in the transparent substrate 2 of this embodiment, the curved side 212 of the transparent base 21 has a structural design containing a radius corner R, a side H (which is an uncut edge), and a chamfer corner C, which can carry out the smooth touch at the side edges and improve the chromatic aberration phenomenon at the curved side.

Figure 5:
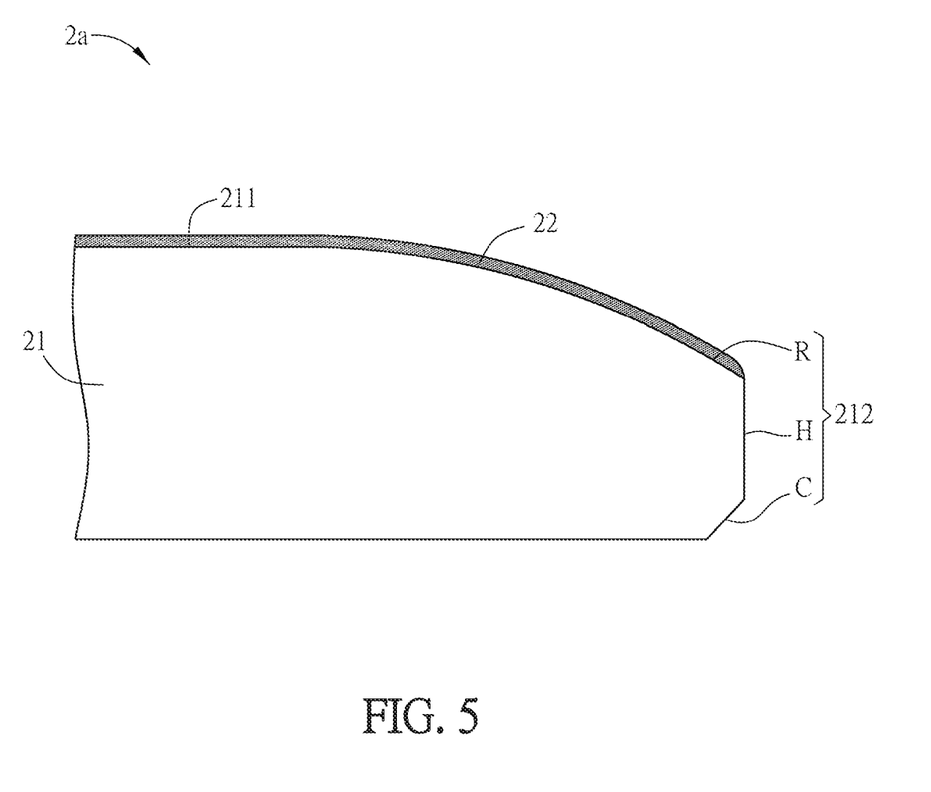
FIG. 5 is a schematic diagram of a transparent substrate according to another embodiment of this disclosure.

FIG. 5 is a schematic diagram of a transparent substrate according to another embodiment of this disclosure. As shown in FIG. 5, the configuration and connections of the transparent substrate 2a of this embodiment are mostly the same as those of the transparent substrate 2 of the above-mentioned embodiment. Different from the above-mentioned embodiment, the transparent substrate 2a of this embodiment further comprises a membrane structure 22. The membrane structure 22 is disposed on the planar surface 211 of the transparent base 21 and extends to cover the radius corner R of the curved side 212. In this embodiment, the membrane structure 22 comprises a plurality of first refraction films and a plurality of second refraction films, and the second refraction films and the first refraction films are alternately stacked. To be noted, the membrane structure 22 can be any of the above-mentioned membrane structures F, Fa, Fb, and Fc, or their modifications. The specific technical content thereof can be referred to the above embodiments, so the detailed descriptions thereof will be omitted.

As mentioned above, in the transparent substrate 2a, the structural design of the curved side 212 can carry out the smooth touch around the side edges and further improve the chromatic aberration phenomenon at the curved side. Moreover, the transparent substrate 2a of this embodiment can achieve wider optical thickness and wider physical thickness according to the structural design of the membrane structure 22 and the refraction match of the coating materials. Accordingly, the planar surface 211 of the transparent substrate 2a can have a lower light reflectance, thereby avoiding the chromatic aberration problem (e.g. gold or red border) at the curved side 212.

In summary, in the membrane structure and the transparent substrate of this disclosure, a plurality of second refraction films and a plurality of first refraction films are alternately stacked. The structural design and the configurations of the refraction indexes of the first refraction films and the second refraction films can effectively reduce the reflectance of light.

In addition, in the transparent substrate of this disclosure, the curved side of the transparent base comprises a radius corner R, a side, H and a chamfer corner C in order, and the planar surface of the transparent base is connected to the radius corner R. This structural design can carry out the smooth touch around the side edges and further improve the border chromatic aberration phenomenon. Moreover, in one embodiment of this disclosure, the transparent substrate can achieve wider optical thickness and wider physical thickness according to the structural design of the membrane structure and the refraction matching. Accordingly, the planar surface of the transparent substrate can have a lower light reflectance, thereby avoiding the chromatic aberration problem (e.g. gold or red border) at the curved side.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A membrane structure, comprising:
a plurality of first refraction films; and
a plurality of second refraction films, wherein:
the second refraction films and the first refraction films are alternately stacked,
the first refraction films and the second refraction films total at least ten films stacked on a transparent base,
in order, the second refraction films comprise a first film, a third film, a fifth film, a seventh film, and a ninth film,
in order, the first refraction films comprise a second film, a fourth film, a sixth film, an eighth film, and a tenth film,
the first film is located at a position closest to the transparent base,
a thickness of the first film is between 3.92 nm and 7.28 nm,
a thickness of the second film is between 57.81 nm and 107.37 nm,
a thickness of the third film is between 9.59 nm and 17.81 nm,
a thickness of the fourth film is between 38.68 nm and 71.83 nm,
a thickness of the fifth film is between 21.89 nm and 40.65 nm,
a thickness of the sixth film is between 14.64 nm and 27.18 nm,
a thickness of the seventh film is between 59.07 nm and 109.71 nm,
a thickness of the eighth film is between 9.35 nm and 17.37 nm,
a thickness of the ninth film is between 22.06 nm and 40.96 nm, and
a thickness of the tenth film is between 71.49 nm and 132.77 nm.

2. The membrane structure of claim 1, wherein the first refraction films comprise at least one of $SiO_2$, $Al_2O_3$, or ZnO, and the second refraction films comprise at least one of $Nb_2O_5$, $Ti_3O_5$, or $Ta_2O_5$.

3. The membrane structure of claim 1, further comprising:
a protection film disposed at a side of the tenth film away from the transparent base.

4. The membrane structure of claim 1, wherein a refraction index of the first refraction films is less than a refraction index of the second refraction films.

5. The membrane structure of claim 1, wherein when a wavelength of an incident light is between 400 nm and 900 nm, an average reflectance of the membrane structure is less than 5.5%.

6. The membrane structure of claim 1, wherein the first refraction films further comprise a zero film disposed between the first film and the transparent base, and a thickness of the zero film is between 27.45 nm and 50.99 nm.

7. The membrane structure of claim 6, further comprising:
a protection film disposed at a side of the tenth film away from the transparent base.

8. A transparent substrate, comprising:
a transparent base having a first surface and a second surface opposite to the first surface; and
the membrane structure of claim 1, wherein the membrane structure is disposed on at least one of the first surface or the second surface of the transparent base.

9. The transparent substrate of claim 8, wherein the transparent substrate is a two-dimensional (2D), two-and-a-half-dimensional (2.5D), or three-dimensional (3D) rigid substrate, or a 2D, 2.5D, or 3D flexible substrate.

10. The transparent substrate of claim 8, wherein a refraction index of the first refraction films is less than a refraction index of the second refraction films.

11. A transparent substrate, comprising:
a transparent base having a planar surface and at least a curved side connected to the planar surface, wherein the curved side comprises a radius corner, a side, and a chamfer corner, and the planar surface is connected to the radius corner; and
the membrane structure of claim 1, wherein the membrane structure is disposed on the planar surface of the transparent base and extends to cover the radius corner of the curved side.

12. The transparent substrate of claim 11, wherein the transparent base is a two-dimensional (2D), two-and-a-half-dimensional (2.5D) or three-dimensional (3D) transparent glass.

13. The transparent substrate of claim 11, wherein a length of the side is equal to a thickness of the transparent base minus a length of the radius corner in a thickness direction of the transparent base and minus a length of the chamfer corner in the thickness direction of the transparent base.

14. The transparent substrate of claim 11, wherein a curvature radius of the radius corner is between 1 mm and 10 mm, and a length of the chamfer corner is 0.15 mm.

15. The transparent substrate of claim 11, wherein a refraction index of the first refraction films is less than a refraction index of the second refraction films.

\* \* \* \* \*